United States Patent [19]

Seger et al.

[11] Patent Number: 4,732,364
[45] Date of Patent: Mar. 22, 1988

[54] WEAR RESISTANT DIAMOND CLADDING

[75] Inventors: Fritz O. Seger, Mission Viejo, Calif.; David R. Hall, Provo, Utah

[73] Assignee: Ameron Iron Works USA, Inc., Houston, Tex.

[21] Appl. No.: 797,601

[22] Filed: Nov. 12, 1985

Related U.S. Application Data

[63] Continuation-in-part of Ser. No. 682,757, Dec. 17, 1984, abandoned.

[51] Int. Cl.⁴ .................. F16K 47/00; E21B 10/00
[52] U.S. Cl. .................... 251/368; 251/122; 251/360; 166/91; 175/329; 175/410
[58] Field of Search ............ 251/368, 122, 333, 360; 137/454.6; 166/91; 175/329, 410, 374

[56] References Cited

U.S. PATENT DOCUMENTS

| | | | |
|---|---|---|---|
| 3,141,746 | 7/1964 | De Lai | 51/307 |
| 3,683,965 | 8/1972 | McClure et al. | 137/625.3 |
| 3,743,489 | 7/1973 | Wentorf, Jr. et al. | 51/307 |
| 3,745,623 | 7/1973 | Wentorf, Jr. et al. | 29/95 B |
| 3,831,428 | 8/1974 | Wentorf, Jr. et al. | 72/467 |
| 3,850,053 | 11/1974 | Bovenkerk | 51/307 |
| 4,156,329 | 5/1979 | Daniels et al. | 51/295 |
| 4,337,788 | 7/1982 | Seger | 137/315 |
| 4,410,054 | 10/1983 | Nagel et al. | 175/107 |
| 4,468,138 | 8/1984 | Nagel | 384/303 |
| 4,515,226 | 5/1985 | Mengel et al. | 175/329 |
| 4,558,753 | 12/1985 | Barr | 175/329 |
| 4,593,777 | 6/1986 | Barr | 175/410 |

FOREIGN PATENT DOCUMENTS

0157278 10/1985 European Pat. Off. ............ 175/329

Primary Examiner—A. Michael Chambers
Attorney, Agent, or Firm—Christie, Parker & Hale

[57] ABSTRACT

An erosion resistant article is formed by cladding a substrate with tiles having a surface layer of polycrystalline material such as diamond or cubic boron nitride. The tiles may be entirely polycrystalline diamond or may have a backing of cemented tungsten carbide. Such an article can be trim for a high pressure valve wherein a sleeve is partly lined with polycrystalline diamond tiles and a plug is clad with polycrystalline diamond tiles.

30 Claims, 10 Drawing Figures

WEAR RESISTANT DIAMOND CLADDING

CROSS-REFERENCE TO RELATED APPLICATION

This application is a continuation-in-part of U.S. patent application, Ser. No. 682,757, filed Dec. 17, 1984, by Fritz O. Seger, entitled ADJUSTABLE CHOKE HAVING WEAR RESISTING CLADDING, now abandoned, and assigned to the same assignee as this application, the subject matter of which is hereby incorporated by reference.

FIELD OF THE INVENTION

This invention relates to cladding a surface subject to wear with tiles of polycrystalline diamond or cubic boron nitride for resisting wear.

BACKGROUND

There are a broad variety of products where abrasive or erosive wear significantly limits the lifetime of the product. For example, the nozzles used for sand blasting have a continual stream of sand or other abrasive grit entrained in a fluid stream that passes through the nozzle at high velocity. Engagement of the grit particles on the nozzle surface may rapidly erode the hardest materials used to make such nozzles. Another nozzle subject to such wear is used in bits for drilling oil wells or the like. A drilling mud is pumped through such nozzles at reasonably high velocity and the nozzles are eroded both in the orifice through which the mud passes and on the exposed face external to the bit.

A variety of other surfaces on bits are also subject to wear from abrasive rock particles as a bit is rotated in a well. In some production wells high velocity gas with entrained particles may be produced and erosion of production equipment may be encountered. This may include hardware down hole or at the ground surface. Valves or chokes are particularly susceptible to such wear because flow velocities in the valve can be quite high, and complex geometries can cause impingement of fluid streams on surfaces that are thereby subjected to extreme wear conditions.

Adjustable chokes play an important role in controlling the rate of production of oil and gas. Such an adjustable choke is placed in the flow line at a wellhead to provide an adjustable orifice or opening through which fluid flows from the well at a rate limited by the size of the opening. Some, but not all, adjustable chokes are intended to operate as a high pressure valve that can close completely. If desired, a separate valve can be placed in the same fluid flow system upstream from the adjustable choke to shut off flow to the adjustable choke.

Some internal parts within an adjustable choke are often exposed to extremely erosive conditions. In particular, certain internal parts which are often called the "trim" cooperate to define the orifice that limits the fluid flow rate through the choke. The flow velocity of the fluid as it passes through that orifice can be quite large; sonic velocities can occur. Such a high fluid flow velocity presents a highly erosive condition. Another possible erosive condition involves particles entrained in the fluid. Either or both of these erosive conditions may be present.

U.S. Pat. No. 4,337,788, assigned to the assignee of this invention, discloses and claims an earlier invention concerning a high pressure valve. One of the advantages of such a high pressure valve arises from the trim structure involved in defining the orifice. This structure includes an elongated plug and a liner sleeve having an elongated bore coaxial with the plug. The plug is continuously movable along its axis between two end positions. At one position, a portion of the plug engages a seat portion of the liner sleeve and closes the valve. At all other positions of the plug, the valve is open, and the size of the orifice increases as the plug moves toward its opposite end or fully open position. Certain features of the plug and the liner sleeve have the effect of localizing erosion of the liner sleeve in regions downstream of the seat portion. This provides the advantage of eliminating leakage when the partly eroded valve is closed. Further, as disclosed in the above-identified patent, such a plug and liner sleeve are preferably arranged within an assembly that is easily removed and replaced. This has been preferred because the plug and liner sleeve typically have worn out much sooner than other parts of the valve.

The above-identified patent discloses the use of cemented tungsten carbide as the material for both the plug and for the liner sleeve. Tungsten carbide is harder than sand that may be entrained in the fluid flowing through the valve, and accordingly would be expected to resist wear from such sand as well as any material that is softer than the sand. Notwithstanding the foregoing, such cemented tungsten carbide plugs and liner sleeves have had a short useful life in some environments. For example, such a plug and liner sleeve wore out in approximately four to five days of use in a gas well producing sandy gas. There is accordingly a substantial need for a high pressure valve having a longer useful life.

Another type of valve used in very high pressure systems and subject to extremely erosive conditions because of high velocity flow is a so-called plug and cage valve. In this type of valve fluid is introduced in the valve casing outside of a hollow cylindrical cage. Various sizes and shapes of orifices lead through the wall of the cage to its interior. A tight fitting plug can move axially in the cage to alternately occult or clear such orifices to block or permit flow through the cage. The plug position in the cage controls the flow through the valve. The edge of the plug in such a valve may be eroded and change the flow through the valve or prevent complete closure of the valve. The cage may be subject to appreciable erosion on the inside around the orifices, apparently due to eddies in the liquid filling the valve.

A broad variety of other surfaces are also subject to erosive wear by abrasive materials or rapidly flowing fluids, some of which may contain abrasive particles. It is highly desirable to protect such surfaces from erosion to prolong the life of the equipment.

Erosion resistance is provided on many such surfaces by constructing the parts of ceramic, cemented tungsten carbide or similar hard material. Generally speaking the harder the material the better it resists erosion. It would be desirable to form erosion and wear resistant articles out of diamond since it is the hardest known material. Cost is not the only reason valve parts and the like are not made of diamond. One cannot make large diamond parts or parts of very complex geometry, regardless of cost.

Techniques have been developed for making polycrystalline diamond products by subjecting a mass containing diamond crystals to high temperatures at sufficiently high pressure that diamond is thermodynamically stable. In effect, the diamond crystals are "welded" together to form a strong polycrystalline mass. For example, U.S. Pat. No. 3,141,746 by DeLai describes formation of polycrystalline diamond (often referred to as PCD). Techniques have also been developed for forming polycrystalline diamond layers on substrates such as cemented tungsten carbide. For example, U.S. Pat. Nos. 3,745,623 by Wentorf, 3,831,428 by Wentorf and 3,850,053 by Bovenkerk illustrate formation of flat layers on a carbide substrate. U.S. Pat. No. 4,109,737 by Bovenkerk illustrates formation of non-flat layers.

The size of parts that can be made with polycrystalline diamond is limited by the need for maintaining extremely high pressures when forming PCD. This has necessarily limited the size of presses capable of reaching such high pressures. Pieces about thirty millimeters across are among the largest made to date. Further, in the presses employed in the techniques described in the above-mentioned patents, isostatic pressure is not obtained and complex shapes do not appear to be feasible. Isostatic pressure is more nearly obtained in presses as described in U.S. Pat. Nos. 2,918,699; 3,159,876 and 3,182,353, for example.

Thus, it is desirable to form valve parts and other surfaces subject to wear and erosion out of diamond but techniques for doing so are not readily available.

BRIEF SUMMARY OF THE INVENTION

There is, therefore, provided in practice of this invention according to a presently preferred embodiment a wear resistant article having a rigid substrate and a plurality of tiles brazed to at least one surface of the substrate. Each of the tiles comprises a surface layer of polycrystalline material selected from the group consisting of diamond and cubic boron nitride. The surface layers of adjacent tiles are sufficiently close to each other to prevent significant erosion between the tiles. The tiles should be sufficiently close together that any erosion is limited to a depth less than the thickness of one of the surface layers. For example, when the distance between the adjacent surface layers is no more than one-sixth of the thickness of the thinner of the adjacent diamond surface layers no significant erosion is observed. Preferably the edges of the tiles are tapered so that the edges of the surface layers abut and there is almost no gap between tiles. In an exemplary embodiment the orifice defining assembly for an adjustable choke or valve has an elongated plug and elongated bore coaxial with the plug. A portion of the plug and a portion of the bore are clad with polycrystalline material.

DETAILED DESCRIPTION

Figure 2:
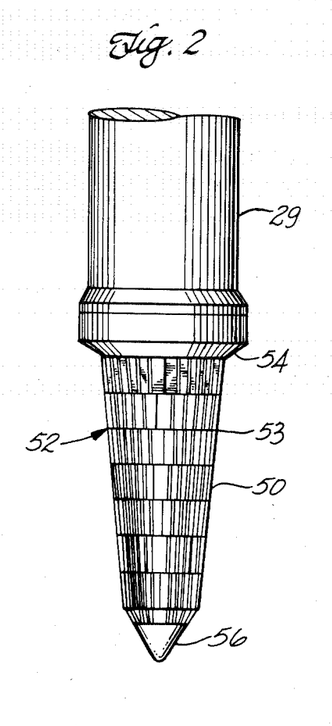
FIG. 2 is an elevation view showing a portion of the plug shown in FIG. 1.
Figure 3:
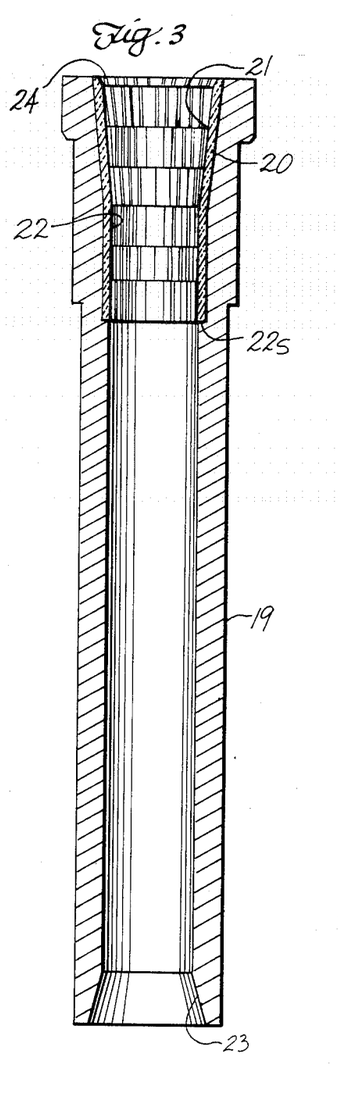
FIG. 3 shows in longitudinal cross section the liner sleeve shown in FIG. 1.

The principles of this invention are illustrated in an adjustable choke or high pressure valve. The depicted choke is intended to control flow rate in a fluid flow system employing a separate valve that can close completely to shut off flow to the choke. The embodiment shown in FIGS. 1 to 3 incorporates many features of the valve disclosed and claimed in U.S. Pat. No. 4,337,788.

Figure 1:
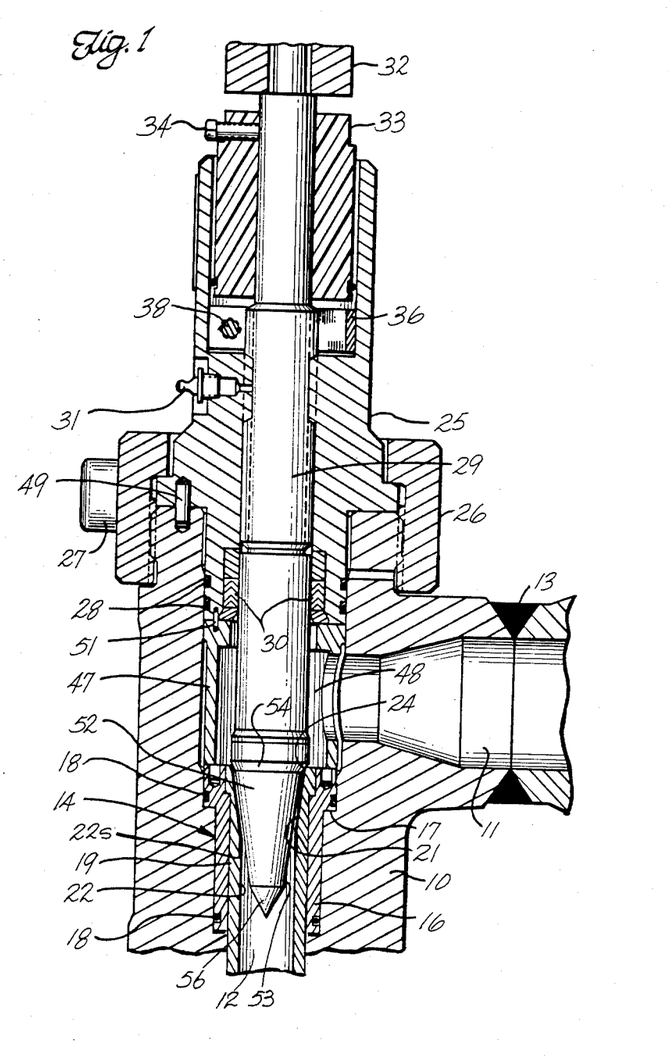
FIG. 1 shows in longitudinal cross section an adjustable choke constructed according to the principles of this invention.

As shown in FIG. 1, the adjustable choke has a steel body 10 having an inlet passage 11 on one side and an outlet passage 12 at one end so that fluid flowing through the choke makes a right angle turn between the inlet and the outlet. Welds 13 are employed for connecting the body to the balance of a fluid flow system.

A removable seat assembly 14 slides into the body in alignment with the outlet passage 12. The seat assembly comprises a support sleeve 16 that fits into the body and bottoms on a shoulder 17 facing upstream in the body. The support sleeve is sealed to the body by O-rings 18.

An elongated liner sleeve 19 is brazed into the support sleeve and is part of an orifice-defining assembly embodying this invention. The material of the liner sleeve is a structural carbide, preferably cemented tungsten carbide. Other structural carbides include tantalum carbide, titanium carbide, and silicon carbide. Exemplary cementing metals include cobalt, nickel and iron. The liner sleeve has a shaped bore extending axially through it. As can be better seen in FIG. 3, a layer 20 of hard polycrystalline material clads portions of the inner surface of the liner sleeve 19. The hard polycrystalline material is selected from the group consisting of diamond and cubic boron nitride. Diamond is harder and less expensive than cubic boron nitride and is accordingly preferred.

One of the clad portions of the liner 19 provides a conical converging passage 21 having a taper of about 10° from the axis of the passage. Immediately downstream from the converging passage is an elongated cylindrical passage 22. A shoulder 22s is provided in the liner 19. The polycrystalline material 20 clads the portion of the inner surface of the liner upstream from the shoulder 22s. The diameter of the cylindrical passage 22 is the same as the smaller end of the converging passage; this diameter determines the maximum choke size. Thus, for example, in a one inch adjustable choke having a control range from 11/64 inch to one inch, the downstream diameter of the cylindrical passage is one inch. Downstream from the cylindrical passage is a diverging passage 23 (FIG. 3) in the liner sleeve which aligns with the outlet passage 12 through the body. An inwardly tapering seat 24 is formed by a portion of layer 20 that clads the upstream end of the liner sleeve. The seat has a taper of about 30° from the axis of the passage.

With reference again to FIG. 1, a bonnet 25 is retained on the body in alignment with the outlet passage by a bonnet nut 26 threaded onto the body. Hammer lugs 27 are provided on the bonnet nut for secure fastening and rapid disassembly. The bonnet is sealed to the body by a pair of high pressure O-ring seals 28, the outer one of which serves as a back-up for the inner primary seal for enhanced reliability. Each high pressure seal in the valve body comprises an O-ring and a backing ring in an O-ring groove.

A longitudinally movable stem 29 is threaded into the bonnet using acme threads, or similar threads that have a flattened crest. The stem is sealed to the inside of the bonnet by high pressure chevron V-ring seals 30. A grease fitting 31 is provided in the bonnet for lubricating the threads. A hand wheel 32 is connected to the outer end of the stem for adjustment of the choke. An indicator sleeve 33 is secured to the stem by a set screw 34 and bears indicia (not shown) on its outer surface for indicating the control setting or degree of opening of the choke.

A split ring 36 fits into the upper end of the bonnet below the indicator sleeve and includes an inner cylindrical surface for engaging the flattened crests on the threads on the stem 29. A bolt 38 extends across the gap in the split ring. The bolt is threaded into the split ring on one side of the gap and passes freely through a counterbore on the other side of the gap. The head of the bolt 38 bears against a sleeve, the other end of which bears against a shoulder at the end of a larger counterbore in the split ring. The sleeve also fits through a more or less tangentially extending hole through the side of the bonnet 25. A dimple is provided in the threaded portion of the bolt for receiving a nylon pellet or the like which inhibits accidental rotation of the bolt and possible loss of the bolt when not tightly engaged.

After the choke is adjusted to its desired setting the bolt 38 is tightened which causes closing of the gap in the split ring. This clamps the inside surface of the ring against the flattened crests of the acme threads on the stem 29. The bolt assembly cannot rotate relative to the bonnet because of the sleeve fitting through the hole in the bonnet. Thus, tightening of the bolt tightly clamps the stem against rotation and prevents a change in the adjustment of the valve. The bolt is loosened when it is desired to change the choke position.

A hollow stainless steel cage 47 fits snugly between the inner end of the bonnet 25 and the upstream edge of the seat assembly 14, thereby retaining the seat assembly in place against the shoulder 17. Fluid enters the cage by way of a side opening 48 aligned with the inlet passage 11 in the body. The cage not only helps retain the seat assembly in place but lines the inside of the body in a region where erosion could otherwise be a problem. The bonnet is maintained in alignment with the body by a pin 49 and the cage is maintained in alignment with the bonnet by another pin 51 thereby assuring that the side opening 48 remains in alignment with the inlet passage.

The inner end of the stem 29 comprises an elongated plug 52 that is part of the orifice-defining assembly embodying this invention. Like the material of liner sleeve 19, the material of the plug 52 is a structural carbide, preferably cemented tungsten carbide. The plug and the bore through liner sleeve 19 are coaxial. As can be more clearly seen in FIG. 2, a layer 50 of hard polycrystalline material clads portions of the surface of the plug. One of the clad portions of plug provides a conical control surface 53 having the same taper (about 10°) as the converging passage 21 defined in the liner sleeve, and another clad portion of the plug 52 provides a surface 54 having the same taper (about 30°) as the seat 24 at the upstream end of the liner 19. The plug has a tip 56 which helps minimize changes in flow direction. Little, if any, erosion is likely to occur at the tip, and it is accordingly not clad. Like the material of the layer 20 within the bore, the material of the layer 50 on the plug is selected from the group consisting of diamond and cubic boron nitride, and preferably is diamond.

Figures 4, 5:
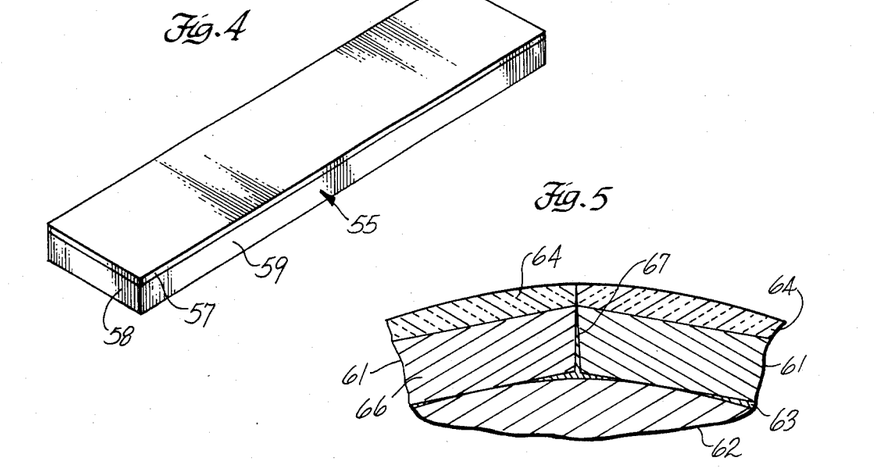
FIG. 4 shows in perspective view a tile used in a cladding layer according to this invention.
FIG. 5 illustrates schematically tiles secured to a substrate by brazing.

In the depicted embodiment, each of these layers comprises a plurality of tessellating tiles. As shown in FIG. 4, each tile 55 used in the depicted embodiment has a generally rectangular or slightly tapered configuration, and includes a hard skin 57 of polycrystalline material and a support or backing 58 of a material such as cemented tungsten carbide. The width of each tile is equal to about 1/36 of the surface to which the support is affixed. In other words, each tile extends 10° around the periphery of the liner or plug. Because the tiles in this embodiment are generally flat, each tessellated layer is faceted. Alternatively, each tile can be curved so that when the tiles are affixed, a smooth surface is defined. The tiles can be made with at least the outer surface of the hard layer 57 curved or the tiles can be cut to a curved surface after affixing to the plug or sleeve.

The tile illustrated in FIG. 4 is suitable for making the conical plug of the valve wear resistant. One side face of the tile is perpendicular to the surface of the hard polycrystalline layer 57 on the tile. The opposite side face 59 is tapered at an angle of 80° from the surface of the hard layer. Thus, when the tiles are abutted edge-to-edge around the plug, the narrow space between adjacent tiles has an approximately uniform width throughout its depth away from the surface.

FIG. 5 illustrates schematically an embodiment of wear resistant article wherein tiles 61 are brazed to a cemented tungsten carbide substrate 62. This figure is not drawn to scale so as to clearly show the structure. In this embodiment flat tiles are secured to the curved substrate by a thin layer of brazing alloy 63, which in a typical embodiment has an average thickness in the order of 25 microns. Each of the tiles has a surface layer 64 of polycrystalline material which is preferably diamond, or in some embodiments may be cubic boron nitride. The diamond layer is formed on a cemented tungsten carbide backing 66. The outer face of the tiles has been curved, preferably after mounting on the substrate. The space between adjacent tiles also contains brazing alloy 67. The sides of the tile have been tapered slightly so that when assembled on the substrate the edges of the adjacent surface layers abut each other and there is a tapered space between the tiles. By having essentially no gap between tiles, erosion between the tiles is avoided. By tapered sides on the tiles is meant an angle on the side of one or both tiles greater than would be needed to form a parallel sided gap, resulting in the ability to abut the edges of adjacent surface layers.

It is important for resisting erosion of the wear resistant article that the tiles be placed sufficiently close to each other to prevent significant erosion between the tiles; that is, insufficient erosion to undermine and cause damage to the surface layers. Softer brazing alloy between adjacent tiles will erode under the influence of abrasive particles or even very high velocity fluid. Even when the edges of the surface layers do not abut, the depth of that erosion between tile is limited by the tiles themselves. The side faces of the tiles interfere with movement of abrasive particles between the tiles due to frictional engagement of the potentially erosive material against the side faces of the tile. Thus, as the brazing alloy 67 between the tiles erodes, the narrow "crevice" between the tiles effectively limits the depth that erosion can progress. Wall friction reduces the velocity in the narrow crevice until there is no longer any significant erosion.

Preferably the crevices between adjacent tiles are narrower than the particles of abrasive material in a fluid stream, particularly any crevices extending in the direction of fluid flow. Erosion can be more severe in such longitudinal crevices than in crevices transverse to the direction of fluid flow. When the particles are larger than the crevices, there is essentially no erosion by the particles. Particles tend to fracture, however, and the pieces can also be erosive. Abrasive particles about the same size as or smaller than a crevice may merely wedge into the crevice and not erode at the bottom of the crevice. A wedged particle resists erosion since it must be removed before further erosion can occur in the crevice. The side walls of the crevice remain intact since the diamond surface layer is so erosion resistant that essentially no wear occurs in reasonable time intervals.

It has been found in an exemplary valve that adverse effects of erosion between the tiles is effectively eliminated when the distance between adjacent tiles is no more than 1/6 of the thickness of the thinner of the surface layers 64 on the adjacent tiles. In a typical embodiment the thickness of the polycrystalline surface layer may be about 0.75 millimeter. In such an embodiment the distance between adjacent tiles is preferably no more than 125 microns. In an environment where relatively large abrasive particles are moving in the fluid stream, the distance between adjacent tiles may be larger without excessive erosion between tiles, particularly when the backing material is cemented tungsten carbide, which is itself quite erosion resistant. It is quite desirable to make the distance between adjacent tiles as small as readily provided by the manufacturing techniques employed. Distances less than 25 microns are desirable, and it is preferred that the spacing be as small as possible while still assuring that brazing alloy is present between adjacent tiles. The edges of tiles at the exposed surface may be in contact, which is the best configuration for resisting erosion, in which case it is desirable to have tapered sides to assure abutment and provide a narrow gap for brazing alloy.

In an embodiment such as illustrated in FIG. 5 an exemplary surface layer of polycrystalline material may have a thickness of about 0.75 millimeter. The thickness of an exemplary backing layer 66 may be 1.5 millimeters. Such a backing layer may be dispensed with in some embodiments and a layer of polycrystalline diamond tiles may be brazed directly to a cemented carbide substrate, for example. The tiles are tiny, ordinarily less than about 12 millimeters long and 3 millimeters wide, and often as little as 1.5 millimeters wide. Larger tiles can of course be used; one exemplary embodiment having tiles about 7 millimeters square.

Known procedures for making the tiles include the procedures described in U.S. Pat. Nos. 3,141,746, 3,745,623, or 3,850,053 (for diamond tiles), and in U.S. Pat. No. 3,743,489 (for cubic boron nitride tiles). Diamond tiles made by such known procedures comprise a layer of diamond crystals bonded to each other, and a cemented carbide backing or a tile that is polycrystalline throughout its thickness. Cemented carbide is a preferred backing because of its high modulus of elasticity, strength and erosion resistance. It is also desirable to use cemented tungsten carbide as the substrate on which the tiles are brazed for much the same reasons and to provide strongest bonding between the tiles and substrate.

Further, a number of companies sell tool parts that can be used. For example, General Electric, Worthington, Ohio, and Sii Megadiamond, Inc. of Provo, Utah, in the U.S.A. and DeBeers of South Africa sell cylindrical tool parts having a circular polycrystalline diamond surface layer and a cylindrical cemented carbide support. In making an embodiment of this invention, such tool parts may be trimmed to the depicted generally rectangular shape by electrical discharge machining.

Electrical discharge machining (EDM) may be used to shape tiles as well as cut tiles from scrap tool parts. EDM can be used to remove part of a diamond surface layer from a flat tile to form a curved surface on the tile. The backing layer of cemented carbide can be similarly formed to better fit on a curved substrate. Instead of forming individual tiles in this manner, the tiles may be secured to the substrate and then formed by EDM to a desired shape. It is particularly preferred to from such wear resistant parts with surfaces in the form of a figure of revolution such as a cylinder or cone since these are readily formed by EDM and lapped for better surface finish. Lapping after EDM is ordinarily desirable since EDM leaves as much as 25 microns of damaged surface on a polycrystalline diamond and subsequent lapping can enhance the surface finish. Grit blasting can also be used to remove damaged material at the surface.

The surface layer of the tiles is preferably polycrystalline diamond because of its extreme hardness and resistance to wear and erosion. As used in this specification the term polycrystalline diamond (or its abbreviation PCD) refers to a material produced by subjecting individual diamond crystals to sufficiently high pressure and high temperature that intercrystalline bonding occurs between adjacent diamond crystals. Exemplary minimum temperature is about 1300° C. and an exemplary minimum pressure is about 35 kilobars. The minimum sufficient temperature and pressure in a given embodiment may depend on other parameters such as the presence of a catalytic material, such as cobalt, with the diamond crystals. Generally such a catalyst/binder material is used to assure intercrystalline bonding at a selected time, temperature and pressure of processing. As used herein, polycrystalline diamond may include residual cobalt or other catalyst, or such catalyst may be leached from the polycrystalline diamond.

In an exemplary embodiment the outer layer of polycrystalline diamond is made from a mixture of diamond crystals and cobalt powder with about 6% by volume of cobalt in the total mixture. Preferably the catalyst metal is present in the range of from 1 to 10% by volume. About 65% of the diamond crystals are in the range of 4 to 8 microns. The other 35% of the diamond crystals are in the range of one-half to one micron. The diamond crystals may be either naturally occurring diamonds or synthetic diamonds produced by a high temperature, high pressure process. The diamond crystal size can range upwardly from submicron sizes. Preferably, they range up to about 20 microns. A mix of sizes is preferably used for dense packing.

A surface layer of polycrystalline cubic boron nitride is essentially similar to a polycrystalline diamond layer except that the high pressure cubic form of boron nitride is used instead of diamond as the starting material.

If desired, diamond crystals can be mixed with precemented tungsten carbide powder to form a composite material as described in U.S. Pat. No. 4,525,178. Alternatively diamond crystals can be mixed with cobalt powder and tungsten carbide powder to make a composite material. In each of these embodiments when the proportion of diamond powder is high, intercrystalline bonding between diamond crystals occurs to make a polycrystalline material which is not substantially entirely diamond, but includes a proportion of cemented tungsten carbide. Such materials can also be used to make tiles for tessellating the surface of a wear resistant article. Such a material can also be used to form a transition layer between a surface layer that has a high proportion of diamond and an underlying cemented carbide substrate.

Figure 6:
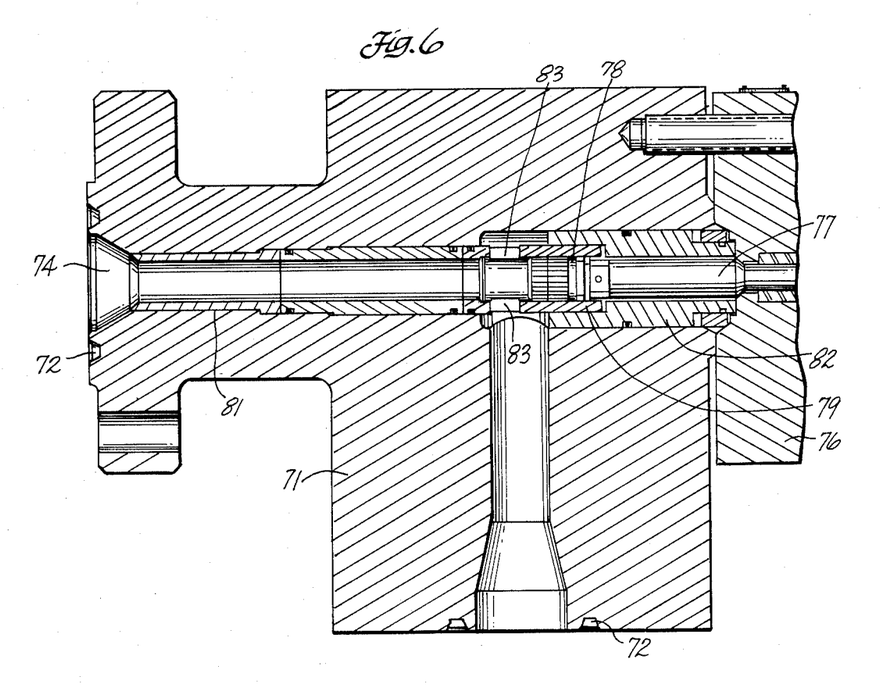
FIG. 6 illustrates in longitudinal cross section a portion of another embodiment of valve employing this invention.
Figure 7:
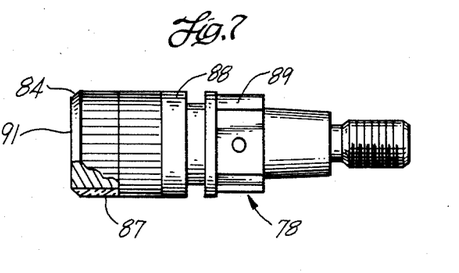
FIG. 7 is a side view of a plug, partly cutaway, for the valve of FIG. 5.
Figure 8:
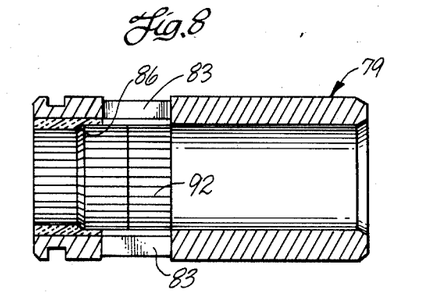
FIG. 8 is a longitudinal cross section of a cage for the valve of FIG. 5.

FIGS. 6 to 8 illustrate another embodiment of valve in which cladding of parts of the valve trim with tiles having a surface layer of polycrystalline material is particularly advantageous. This is a high pressure embodiment of a type of valve sometimes referred to as a cage and plug valve.

The valve body 71 is a heavy block of steel for resisting the very high pressures involved in this embodiment of valve. The valve bolts into a piping system as a right angle connection and is sealed thereto by high pressure seals in grooves 72 surrounding the valve inlet 73 and valve outlet 74. A valve operator 76 is bolted to the valve body for opening and closing the valve. Only the connection of the valve operator to the body is illustrated in the longitudinal cross section of FIG. 6 since it is conventional and the details of the operator form no part of this invention. Such an operator can be hydraulically, pneumatically, electrically, or manually operated, as desired.

A valve stem 77 extends from the operator into the valve body. A plug 78, also illustrated in FIG. 7, is mounted on the end of the stem. The plug is axially slidable in a cylindrical cage 79 which is also illustrated in enlarged form in FIG. 8. A set of liner sleeves 81 are mounted in the valve body between the end of the cage 79 and the valve outlet 74. These downstream sleeves 81 are made of tungsten carbide for erosion resistance and, if desired, some or all of the length of these sleeves may be clad with a surface layer of polycrystalline material tiles as herein described. A retainer sleeve 82 secures the cage and downstream sleeves in place in the valve body.

The cage has a pair of diametrically opposite passages 83 between the exterior of the cage and the bore in which the plug can slide. The plug can be moved between a fully opened position as illustrated in FIG. 6 toward the outlet so that the plug progressively occults the passages 83 through the wall of the cage. This prevents fluid flow through the cage and thereby progressively decreases fluid flow through the valve. A conical seat 84 on the end of the plug engages a conical seat 86 in the cage when the valve is completely closed. Flow control is obtained by occulting the passages through the cage with the plug. Since the valve is used for very high pressure service, high velocities of fluid flow through the passages 83 are common, particularly when the valve is almost closed. The high velocity fluid streams can subject the plug and cage to serious erosion.

The perimeter of the plug at its downstream end is clad with tiles 87 having a surface layer of polycrystalline material such as diamond or cubic boron nitride. In this embodiment the plug comprises a cylinder 88 of tungsten carbide on which the tiles are brazed and a steel plug adapter 89 brazed to the tungsten carbide cylinder. The plug adapter permits the plug to be screwed into the end of the stem 77. In the illustrated embodiment the substantially flat downstream face 91 of the plug is not clad with tiles having a surface layer of polycrystalline material. Cemented tungsten carbide is sufficiently erosion resistant to remain exposed for this surface. If desired this downstream face may also be clad with diamond. The interior of the cage, from at least the passages 83 to the downstream end, is clad with tiles 92 having a surface layer of polycrystalline material. These tiles include the seat 86. The cage itself is preferably made of cemented tungsten carbide to minimize erosion through the passages 83. The diamond tiles in the bore of the cage protect the cage from the otherwise severe erosion that may occur in this high pressure valve.

Figure 9:
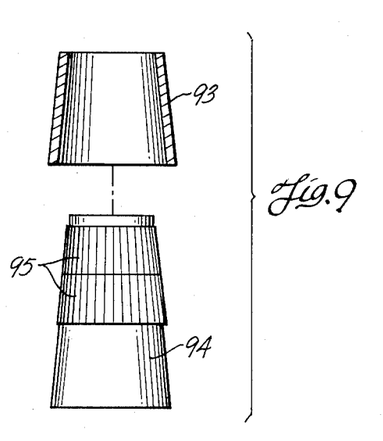
FIG. 9 is a schematic illustration of a manufacturing technique for a tiled wear resistant article.

Such tiles may be affixed to the plug and in the sleeve by furnace brazing. FIG. 9 illustrates schematically one technique for furnace brazing tiles in a conical sleeve 93. A conical graphite mold 94 is machined to have a surface complementary to the desired cone of the surface layer of polycrystalline material. A plurality of tiles 95 are assembled on the mandrel using a suitable adhesive such as Superglue or rubber cement between the diamond layer and the mandrel. In a typical assembly, 35 tiles are assembled on the mold and placed as close together as possible. The remaining space between tiles can have appreciable variation due to accumulated tolerances in the width of the assembled tiles. The thirty-sixth tile is selected or cut to a desired width to substantially fill the remaining space and leave minimum crevice width. A thin layer of braze alloy powder such as AWS alloy, BAg-1, Easyflo 45, or Handy and Harmon Alloy 495 is placed on the tungsten carbide face of the tiles or in the bore of the carbide sleeve 93. Such powder can be applied in the form of a conventional brazing paste containing a suitable flux. The sleeve is fitted over the tiles and the entire assembly heated in a protective atmosphere for melting the brazing alloy and brazing the tiles to the liner. Some of the brazing alloy also flows into the crevices between adjacent tiles.

Tiles may be affixed to a plug in a similar manner by positioning such tiles in a graphite mold having the desired shape of the plug. Brazing alloy powder is positioned between the tungsten carbide face of the tiles and the tungsten carbide plug. Upon heating the tiles are brazed to the plug.

Another technique for assembling polycrystalline material tiles on a substrate may be used when tessellating the surface of a part with tile when it is inconvenient to place tile in a mold. This might be used, for example, for a long slender plug where placing tiles in a deep narrow mold would be difficult. According to this technique tiles are assembled with the faying surface against a temporary mold. The mold surface can be tacky for temporarily adhering the tiles in place or a wax or similar somewhat tacky plastic material can be used for the temporary mold. The tiles are assembled with the polycrystalline surface layer away from the mold interface. Thus, a partial replica of the finished part is made on a temporary mold. If desired, the assembled tiles can be accurately positioned by pressing in a closed die complementary to the finished article for deforming such a plastic mold.

The exposed faces of the tiles on the partial replica of the article being made are then plated with a thin layer of metal such as copper for securing the tiles together in a fixed geometry. A plated layer 0.1 to 0.2 millimeters thick may be sufficient if the plated tile subassembly is carefully handled. The tiles may be electroless or electrolytically plated or a flash electroless plate may be applied before electroplating. The plated tile subassembly is removed from the mold and placed on the substrate to which the tiles are to be brazed. The tiles are then brazed in place by conventional furnace brazing. When this is completed the plating can be removed by sand blasting or etching to expose the surface layer of polycrystalline material.

Figure 10:
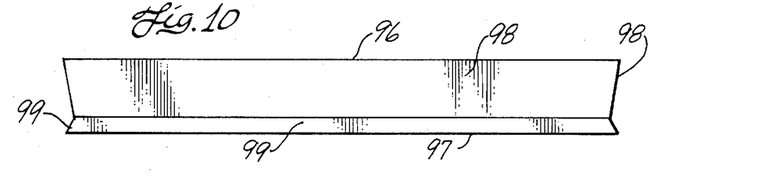
FIG. 10 is a side view of another embodiment of tile used in a cladding layer.

FIG. 10 is a side view of another embodiment of polycrystalline diamond tile suitable for cladding a surface for wear resistance. In this embodiment each of the sides of the tile is slightly concave between the exposed face 96 and the faying surface 97 that is adhered to the substrate for forming an erosion resistant article. For example, each side may have a first face 98 that tilts inwardly at an angle of about 80° from the front face of the tile. Near the back face 97 of the tile each side flares outwardly again in a face 99 at an angle of about 70° from the back face. These flaring faces 99 collectively form a dovetail like enlargement at the back face of the tile.

When adhered to a substrate some of the brazing alloy fills the space between adjacent tiles, locking the dovetail base of the tile to the substrate. These tiles flare outwardly from the "waist" between the side faces 98 and 99 assymetrically so that the front face 96 is broader than the back face 97. This permits the tiles to be in contact at the outer face while having a gap between the tiles at the back face. An essentially continuous exposed face is thereby presented by the assembled tiles. Erosion of the material between tiles is thereby effectively precluded. Because of this, epoxy resin or the like can be used instead of brazing alloy for securing the tiles on the substrate in some embodiments.

In an exemplary embodiment such a tile may have a thickness of 0.75 millimeters and be 6 or 7 millimeters square. The tile is one layer of polycrystalline diamond without a backing layer. Such tiles can be made to uniform net size without machining, by high pressure, high temperature pressing of shaped preforms. Several such tile are made in each press run. Many variations in size and shape of such tiles with concave or dovetail sides are possible. For example, the tapers on the sides can be greater or less so that the tiles can be assembled onto significantly curved substrates and still maintain intimate contact at the front face and a web of bonding material at the back face. The exposed face of a tile can be wider than the back face for a surface that is convex, such as the embodiments of FIGS. 4 and 10; or the back face can be wider than the front face for a concave surface. In this latter embodiment the sides may be flat and diverge from the front face at an angle less than a radius from the center of curvature to the surface, thereby permitting the edges of exposed faces of adjacent tiles to be in contact while leaving a web of bonding material between adjacent tiles at the back face and an effective dovetail joint for each tile.

An adjustable choke embodying this invention has substantial advantages. An actual embodiment has proven to have a superior useful life, in comparison with the best known prior art. As mentioned above, a high pressure valve embodying a cemented tungsten carbide plug and sleeve was used to choke the flow of gas from a sandy gas well and the plug and sleeve wore out in about four to five days. In contrast, a choke embodying the depicted embodiment of this invention was used in the same sandy gas well, and after about one month of use was disassembled for inspection and found to show no noticeable wear.

Although the specific embodiments described and illustrated herein are high pressure valves or chokes it will be apparent that principles of this invention can be applied to other types of valves or other articles where the surface is subject to wear or erosion. For example, the surfaces of sand blasting nozzles and drilling mud nozzles can be teselated with tiles having a surface layer of polycrystalline diamond. Other fabrication techniques can also be used, such as for example, by brazing tiles individually onto the substrate. This is, however, difficult since the tiles must be positioned on a hot substrate and oxidation protection may be quite inconvenient. Other modifications, variations and utilizations will be apparent to one skilled in the art and it is therefore to be understood that the invention may be practiced other than as specifically described.

What is claimed is:

1. A wear resistant article comprising:
   a rigid substrate; and
   a plurality of separate tiles in sufficiently close side by side relation for forming an approximately continuous layer secured to at least one surface of the substrate, each of the tiles comprising at least a surface layer of polycrystalline material selected from the group consisting of diamond and cubic boron nitride, the surface layers of adjacent tiles being parallel to the surface of the substrate to which they are secured to form an approximately continuous wear resistant surface on the article and the side edges of adjacent tiles being sufficiently close to each other to prevent significant erosion of the substrate between the tiles.

2. A wear resistant article as recited in claim 1 wherein the distance between adjacent surface layers is no more than one-sixth of the thickness of one of the surface layers.

3. A wear resistant article as recited in claim 1 wherein the distance between adjacent surface layers is less than the size of particles in a fluid stream adjacent to the surface layers for inhibiting particle erosion in crevices between adjacent surface layers.

4. A wear resistant article as recited in claim 1 wherein each of the tiles comprises a cemented tungsten carbide backing layer connected to the surface layer and brazed to the substrate.

5. A wear resistant article as recited in claim 4 wherein the substrate comprises cemented tungsten carbide.

6. A wear resistant article comprising:
   a rigid substrate; and
   a plurality of separate tiles in sufficiently close side by side relation for forming an approximately continuous layer secured to at least one surface of the substrate, each of the tiles comprising at least a surface layer of polycrystalline material selected from the group consisting of diamond and cubic boron nitride, the surface layers of adjacent tiles being parallel to the surface of the substrate to which they are secured to form an approximately continuous wear resistant surface on the article and the side edges of adjacent tiles being sufficiently close to each other to prevent significant erosion of the substrate between the tiles; and wherein at least the outer face of the surface layer is a non-flat surface of revolution.

7. A control portion of the trim of a flow control valve comprising:

a rigid substrate; and a plurality of separate tiles in sufficiently close side by side relation for forming an approximately continuous layer secured to at least one surface of the substrate, each of the tiles comprising at least a surface layer of polycrystalline material selected from the group consisting of diamond and cubic boron nitride, the surface layers of adjacent tiles being parallel to the surface of the substrate to which they are secured to form an approximately continuous wear resistant surface on the article and the side edges of adjacent tiles being sufficiently close to each other to prevent significant erosion of the substrate between the tiles; and being sufficiently close to each other to prevent significant erosion of the substrate between the tiles.

8. A wear resistant article as recited in claim 7 wherein the article comprises an elongated plug having a control surface clad with such tiles.

9. A wear resistant article as recited in claim 8 wherein the control surface comprises a conical surface on the plug.

10. A wear resistant article as recited in claim 7 wherein the article comprises a sleeve having a bore at least partially clad with such tiles.

11. A wear resistant article as recited in claim 10 wherein the bore is conical.

12. A wear resistant article as recited in claim 10 wherein the bore is cylindrical.

13. A wear resistant article as recited in claim 12 wherein the sleeve comprises a plurality of passages through the wall of the sleeve between the exterior and the bore.

14. A wear resistant article comprising:

a rigid substrate; and a plurality of separate tiles in sufficiently close side by side relation for forming an approximately continuous layer secured to at least one surface of the substrate, each of the tiles comprising at least a surface layer of polycrystalline material selected from the group consisting of diamond and cubic boron nitride, the surface layers of adjacent tiles being parallel to the surface of the substrate to which they are secured to form an approximately continuous wear resistant surface on the article and the side edges of adjacent tiles being sufficiently close to each other to prevent significant erosion of the substrate between the tiles; and wherein at least a portion of the tiles has concave side faces.

15. A wear resistant article comprising:

a rigid substrate; and a plurality of separate tiles in sufficiently close side by side relation for forming an approximately continuous layer secured to at least one surface of the substrate, each of the tiles comprising at least a surface layer of polycrystalline material selected from the group consisting of diamond and cubic boron nitride, the surface layers of adjacent tiles being parallel to the surface of the substrate to which they are secured to form an approximately continuous wear resistant surface on the article and the side edges of adjacent tiles being sufficiently close to each other to prevent significant erosion of the substrate between the tiles; and wherein at least a portion of the tiles has a dovetail portion adjacent the substrate.

16. A wear resistant article as recited in claim 1 wherein at least a portion of the tiles has at least one side face that is non-perpendicular to the surface layer.

17. A wear resistant article as recited in claim 1 wherein the surface layers of adjacent tiles are sufficiently close to each other to prevent erosion to a depth greater than the thickness of one of the surface layers.

18. A wear resistant article comprising:

a rigid substrate; and a plurality of separate tiles in sufficiently close side by side relation for forming an approximately continuous layer secured to at least one surface of the substrate, each of the tiles comprising at least a surface layer of polycrystalline material selected from the group consisting of diamond and cubic boron nitride, the surface layers of adjacent tiles being parallel to the surface of the substrate to which they are secured to form an approximately continuous wear resistant surface on the article and the side edges of adjacent tiles being sufficiently close to each other to prevent significant erosion of the substrate between the tiles; and wherein the side of at least one of a pair of adjacent tiles is tapered so that the surface layers of the adjacent tiles can abut and a tapered gap is left between the adjacent tiles.

19. A wear resistant article comprising:

a rigid substrate; and a plurality of separate tiles in sufficiently close side by side relation for forming a substantially continuous tile layer, each tile having one face secured to a surface of the substrate, each of the tiles comprising at least a surface layer opposite to the face secured to the substrate and comprising a polycrystalline material selected from the group consisting of diamond and cubic boron nitride, and a side of at least some of the tiles being non-perpendicular to the exposed face of such a tile, at least a portion of the sides of such tiles being next to each other for tessellating a surface of the article with a substantially continuous wear resistant layer.

20. A wear resistant article as recited in claim 19 wherein one side of such a tile is perpendicular to the exposed face and the opposite side is non-perpendicular to the exposed face for fitting the tiles together on a non-flat substrate.

21. A wear resistant article as recited in claim 19 wherein the sides of such a tile are concave.

22. A wear resistant article as recited in claim 19 wherein one face of such a tile is wider than the opposite face for fitting the tiles together on a non-flat substrate.

23. A wear resistant article as recited in claim 19 wherein the sides of such a tile include a dovetail portion adjacent one face of the tile.

24. A wear resistant article as recited in claim 19 wherein the side of at least one of a pair of adjacent tiles is tapered so that the surface layers of the adjacent tiles can abut and a tapered gap is left between the adjacent tiles.

25. An orifice-defining assembly for an adjustable valve comprising:

a plug having a portion clad with a wear resistant layer comprising a plurality of separate tiles in sufficiently close side by side relation for forming an approximately continuous layer, each of the tiles having a surface of polycrystalline material;

a sleeve having a bore coaxial with the plug, the bore having a portion clad with a wear resistant layer comprising a plurality of tiles in side by side relation, each of the tiles having a surface of polycrystalline material;

the plug being movable axially through the bore between opposite end positions for controlling the rate of fluid flow through the valve;

the sides of tiles on the plug being sufficiently close to each other to prevent significant erosion of the substrate between adjacent tiles;

the sides of tiles on the sleeve being sufficiently close to each other to prevent significant erosion of the substrate between adjacent tiles; and the polycrystalline material being selected from the group consisting of diamond and cubic boron nitride.

26. An assembly as recited in claim 25 wherein the tiles of polycrystalline material cladding each portion are brazed onto the respective portion.

27. An assembly as recited in claim 25 wherein the tiles comprise a surface layer of polycrystalline diamond and a backing of cemented tungsten carbide.

28. An assembly as recited in claim 27 wherein the plug and sleeve each comprise cemented tungsten carbide.

29. An assembly as recited in claim 25 wherein the plug has a conical surface clad with such tiles and the sleeve has a conical portion of the bore clad with such tiles.

30. An assembly as recited in claim 25 wherein the plug has a cylindrical surface clad with such tiles, the sleeve has a cylindrical portion of the bore clad with such tiles, and the sleeve comprises a plurality of passages through the wall of the sleeve between the exterior and the bore.

* * * * *

UNITED STATES PATENT AND TRADEMARK OFFICE
CERTIFICATE OF CORRECTION

PATENT NO. : 4,732,364

DATED : March 22, 1988

INVENTOR(S) : Fritz O. Seger

It is certified that error appears in the above-identified patent and that said Letters Patent is hereby corrected as shown below:

Front page of Patent [73]
Assignee should be -- Cameron Iron Works USA, Inc. --.
Column 8, line 23, "from" should be -- form --.
Column 12, line 14, "teselated" should be -- tesselated --.

Signed and Sealed this

Sixth Day of September, 1988

Attest:

DONALD J. QUIGG

*Attesting Officer*   *Commissioner of Patents and Trademarks*